(12) United States Patent
Chan et al.

(10) Patent No.: US 8,266,479 B2
(45) Date of Patent: Sep. 11, 2012

(54) PROCESS ACTIVENESS CHECK

(75) Inventors: Wilson Chan, San Mateo, CA (US);
Cheng-Lu Hsu, Sunnyvale, CA (US);
Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 261 days.

(21) Appl. No.: 12/419,227

(22) Filed: Apr. 6, 2009

(65) Prior Publication Data

US 2010/0254254 A1     Oct. 7, 2010

(51) Int. Cl.
*G06F 11/00* (2006.01)
(52) U.S. Cl. ...................... 714/47.1; 714/38.1
(58) Field of Classification Search .................. None
See application file for complete search history.

(56) References Cited

U.S. PATENT DOCUMENTS

| 5,506,955 | A  | * | 4/1996  | Chen et al. ................... 714/26   |
| 5,715,386 | A  | * | 2/1998  | Fulton et al. ............... 714/38.12 |
| 6,629,266 | B1 | * | 9/2003  | Harper et al. ................ 714/38.1 |
| 6,748,555 | B1 | * | 6/2004  | Teegan et al. .............. 714/38.12 |
| 7,237,242 | B2 | * | 6/2007  | Blythe et al. .................. 718/105 |
| 2003/0014694 | A1 | * | 1/2003 | Draperi ........................... 714/38 |
| 2005/0055383 | A1 | * | 3/2005 | Dias et al. ..................... 707/202 |
| 2005/0055673 | A1 | * | 3/2005 | Dias et al. ..................... 717/127 |
| 2005/0086246 | A1 | * | 4/2005 | Wood et al. ................... 707/101 |
| 2006/0271916 | A1 | * | 11/2006 | Abe ............................. 717/128 |

* cited by examiner

*Primary Examiner* — Scott Baderman
*Assistant Examiner* — Jason Bryan
(74) *Attorney, Agent, or Firm* — Hickman Palermo Truong Becker Bingham Wong LLP

(57) ABSTRACT

Described herein are techniques for dynamically monitoring process activeness of processes running on a computing node. Problems affecting processes to serve their designated functions on the computing node can be relatively quickly detected and dealt with, thereby making restoring process activeness on the computing node much more quickly than otherwise.

20 Claims, 4 Drawing Sheets

--- monitor one or more progress logs generated by one or more processes, wherein the progress logs include past operation completion information reported by the one or more processes 310 determine, based on the past operation completion information in the progress logs, whether one or more processes are running normally 320 in response to determining, based on the past operation completion information in the progress logs, that one or more processes are not running normally, determine whether at least one of the one or more processes is restorable to be running normally 330 monitor one or more progress logs generated by one or more processes, wherein the progress logs include past operation completion information reported by the one or more processes 310 determine, based on the past operation completion information in the progress logs, whether one or more processes are running normally 320 in response to determining, based on the past operation completion information in the progress logs, that one or more processes are not running normally, determine whether at least one of the one or more processes is restorable to be running normally 330

FIG. 3

PROCESS ACTIVENESS CHECK

FIELD OF THE INVENTION

The present invention relates to improving performance of computer systems, and in particular, to dynamically monitoring process activeness in computer systems.

BACKGROUND OF THE INVENTION

In a multi-node system, a node may fail from time to time. Typically, failure of a node is not an orderly planned event and has to be inferred by other nodes in the multi-node system. To detect a node failure, each node in the multi-node system may employ a heartbeat mechanism in which the node expects each other node to send a heartbeat message periodically. If any node has missed sending heartbeat messages for an extended period of time, that node may be deemed as failed by other nodes in the multi-node system.

However, a node may be a complicated computing system with many entities involved. There may be many different failure modes for such a computing system. In some failure modes, a node may fail rapidly, while in some other failure modes, a node may not fail rapidly but rather degrade slowly over a period of time. A node may fail as a result of a culmination of one or more problems that have been developing over an extended period of time. Even though the problems could be easily fixed when addressed early on, under the existing techniques, detection of these problems are often too late and actions to deal with the problems too drastic, thereby causing many adverse side effects and overall performance degradation. For example, a process on a node may have a memory leak problem due to a programming error. This problem can be easily resolved if addressed early on, for example, by killing this process and starting a new one. Left unaddressed, however, an operation that should be completed by the process within 10 seconds may at some point of time take 100 seconds to complete, because the process may engage in numerous page fault operations related to the memory leak. The process may eventually become unresponsive, leading to additional failures of counterpart processes that interact with the process. Sometimes, this may result in a node failure or a cluster failure.

As clearly shown, techniques are needed to dynamically monitor process activeness in computer systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is an example processing flow for dynamically monitoring progress logs according to an embodiment of the present invention;

DETAILED DESCRIPTION OF THE INVENTION

Figure 1:
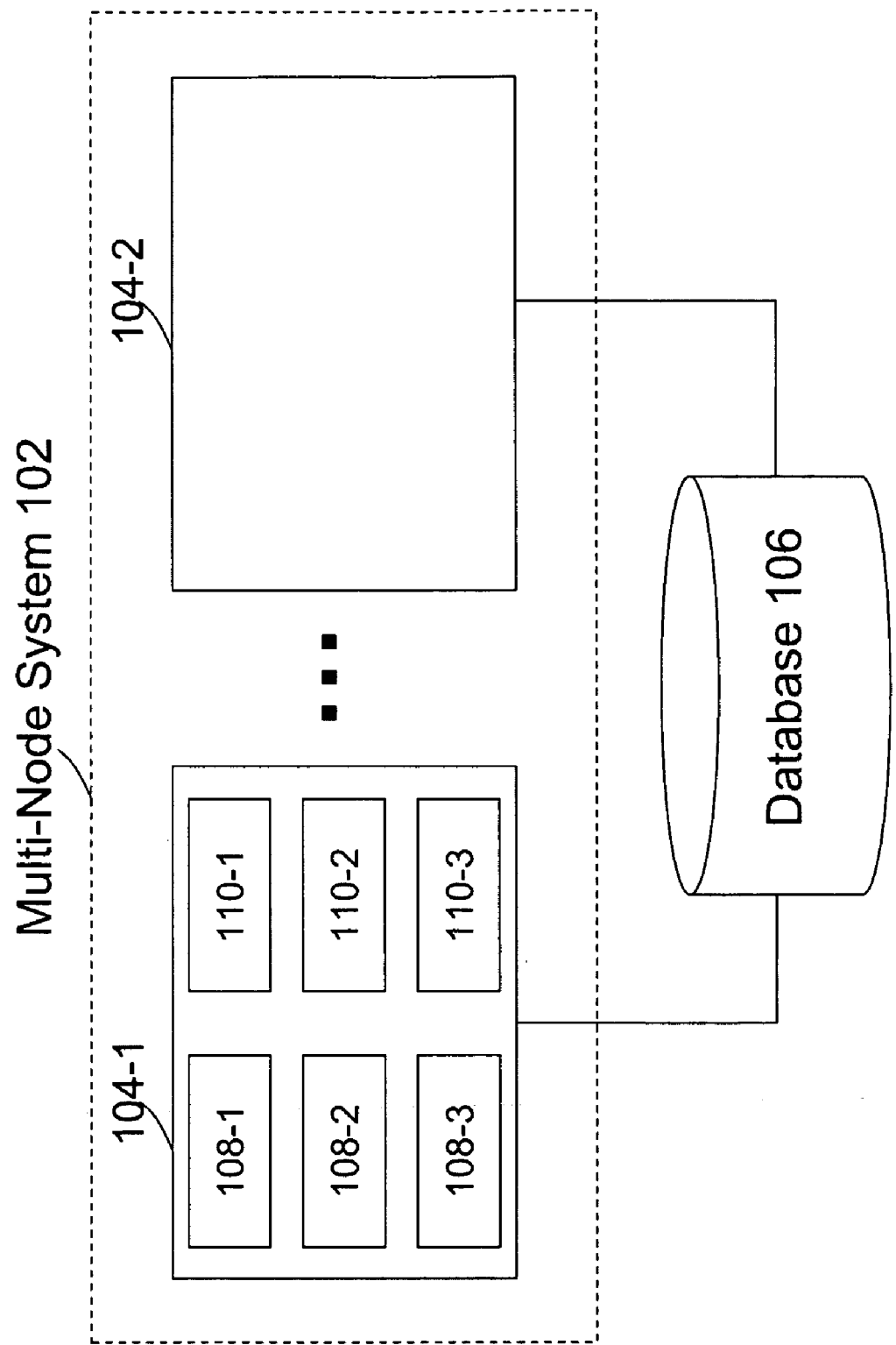
FIG. 1 illustrates an example system that comprises an example multi-node system according to an embodiment of the present invention.

Techniques for dynamically monitoring process activeness in a computer system are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Under new techniques as described herein, a process updates its progress in a progress log. Counterpart processes may check the progress of the process by examining the progress log. Based on the progress log, the counterpart processes can determine whether the process is serving its function normally, is being starved of CPU time, is experiencing data corruption, is experiencing deadlocks, etc. The counterpart processes can compute a number of measures about the process. Take, for example, a process that receives and processes (e.g., cluster configuration) message in a loop. Based on the progress log, the counterpart processes can determine a numeric measure for how many messages the process has processed since a given time. Based on the same progress log, the counterpart processes can also determine what kinds of messages the process has processed. Similarly, the counterpart processes can further determine how long the process finishes an operation (e.g., processing a received message).

In some embodiments, the counterpart processes may work in conjunction with an activeness monitoring mechanism. Thus, if and when a process is reporting activities or non-activities that indicate that the process is not performing its designated function normally, a suitable activeness restoration strategy for the affected function may be selected and implemented by the activeness monitoring system.

Unlike existing techniques that use other nodes in a multi-node cluster to infer existence of problems that may be experienced by a particular node, under new techniques, the (local) counterpart processes and activeness monitoring mechanism can relatively quickly determine whether the node, or processes thereon, are experiencing problems and how serious these problems are. Accordingly, the local activeness monitoring mechanism on the node 104 can relatively quickly take effective restorative measures including rebooting or resetting the node 104.

Example Database System

According to an embodiment, techniques described herein may be performed by a database system, although the present invention is not so limited. A database comprises database data and metadata that is stored on a persistent memory mechanism, such as a set of hard disks. Database data may be stored in one or more data containers represented on the persistent memory mechanism. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminologies.

A database management system ("DBMS") manages a database. A DBMS may comprise one or more database servers. A multi-node system as described below may be used to implement the database management system. Each node in the multi-node system may host a database server. A server, such as a database server, is a combination of integrated software components and an allocation of computational resources, such as memory, a node, and processes on the node for executing the integrated software components on one or more processors, the combination of the software and computational resources being dedicated to performing a particular function on behalf of one or more clients.

User applications as database clients interact with a database server by submitting to the database server commands that cause the database server to perform operations on data stored in a database. A database command may be in the form of a database statement that conforms to a database language. One non-limiting database language supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex data types.

Example Multi-Node System

According to an embodiment of the present invention, techniques as described herein may be performed by a multi-node system 102 as illustrated in FIG. 1, which comprises multiple interconnected nodes (e.g., 104-1 and 104-2). The system 102 may provide user applications access to a database 106. These user applications may run on application servers that are operatively linked to the multi-node system 102. The nodes (104) in the multi-node system 102 may be in the form of computers (e.g. work stations, personal computers) interconnected via a network. Alternatively, the nodes (104) may be nodes of a grid, where each node is interconnected on a rack. The grid may host multiple multi-node systems. Each node 104 may be a separate physical computer, or a separate domain (which, for example, may run inside a virtual machine) among a plurality of domains that partition a physical computer. In embodiments where some of the nodes 104 may be domains, each domain behaves independently like a separate physical computer and constitutes a separate logical computer.

Restartable and Non-Restartable Processes

Each node 104 may host a number of processes. Some of the processes may be non-restartable processes (such as 108-1 through 3) while other processes may be restartable (such as 110-1 through 3). As used herein, a non-restartable process on a node 104 refers to a process that is associated with a critical function on the node 104; restarting the non-restartable process without rebooting or resetting the node 104 will adversely impact the critical function and may leave the node 104, or some processes thereon, in an inconsistent state. If the non-restartable process encounters a problem and needs to be restarted, in order to fully restore the critical function served by the non-restartable process, the node 104 may need to be rebooted or reset. An example of a non-restartable process may be, but is not limited to, a background process on which many other processes depend. The background process may, for example, be responsible for a node-wide lock mechanism that coordinates access of other processes to buffer caches, which are in relatively fast memory of the node 104 and can be used to store images of data blocks from or to the database. If the background process is restarted without resetting or rebooting the node 104, the other processes that have been granted with, or are in the process of waiting for, latches for data blocks may be left in an inconsistent state. The node 104 or the multi-node cluster may perform poorly or even fail if lingering in the inconsistent state for too long. Thus, if the background process responsible for the node-wide lock mechanism needs to be restarted, the node 104 needs to be reset or rebooted.

On the other hand, a restartable process may serve a non-critical function; to restore or recover the non-critical function for the failed restartable process, the node 104 generally does not need to be rebooted or reset. In some embodiments, to restore the non-critical function of the failed restartable process, a new process may be started. Optionally and/or alternatively, an existing process may be used, to replace the failed restartable process. An example of a restartable process may be a foreground process that creates a database session upon being attached by a remote user application. If the foreground process fails, the impact is limited and easily replaced. In some embodiments, a new foreground process, or another existing foreground process, may be used to replace the failed foreground process without needing to reset or reboot the node 104. Terminating or restarting a failed foreground process may only be felt by the remote user application temporarily; the remote user application can simply retry and be switched from the failed foreground process to a different node 104 or a different foreground process on the same node 104. Generally speaking, restarting of a restartable process may produce only limited, transient and local effect, rather than a widespread, lasting and non-local effect that is associated with restarting of a non-restartable process without also rebooting or resetting the node 104.

Example Functions and Operation Types

Different processes (108 and 110) on the node 104-1 as illustrated in FIG. 1 may serve different functions. To serve a function, a process (108 or 110) may support a plurality of operation types. As used herein, the term "an operation type" refers to a type of work necessary for providing an aspect or a feature of a function for which a process is designated. A process may require a plurality of operation types to support various aspects or features of its designated function. In some embodiments, each operation type may be identified by a unique opcode (which may be a hexadecimal or alpha numeric identifier, a bit string, etc.) in progress logs. The term "an operation" refers to an instance of executing a series of steps for the purpose of carrying out a type of work associated with an operation type.

For example, if the process 110-1 is a foreground process responsible for a function of communicating with remote user applications, it may support a plurality of operation types related to carrying out database operations requested by the remote user applications. One of the operation types for the foreground process 110-1 may be that of an attachment operation to create a database session for a requesting remote user application. This operation type may trigger the foreground process 110-1 to perform other operation types not explicitly requested. For example, when performing the attachment operation, the foreground process 110-1 may perform related operation types such as reserving resources for the newly created database session. Once the database session is created, other operation types such as handing database operation requests from the remote user application may be performed by the foreground process 110-1. The foreground process 110-1 may support a detachment operation requested by the remote user application at the end of the database session. Like the attachment operation, the detachment operation may trigger the foreground process 110-1 to perform other operation types not explicitly requested, such as releasing resources. The foreground process 110-1 may be attached and detached successively or in parallel by a plurality of remote user applications. Each database session the process 110-1 engages in with a remote user application may require performing some common and some different operation types. Furthermore, each such database session may require performing different numbers or counts of various operation types. In its entire lifespan, the foreground process 110-1 may therefore repeatedly perform some, or all, of the plurality of operation types associated with its function.

Process Activeness Monitoring

Figure 2:
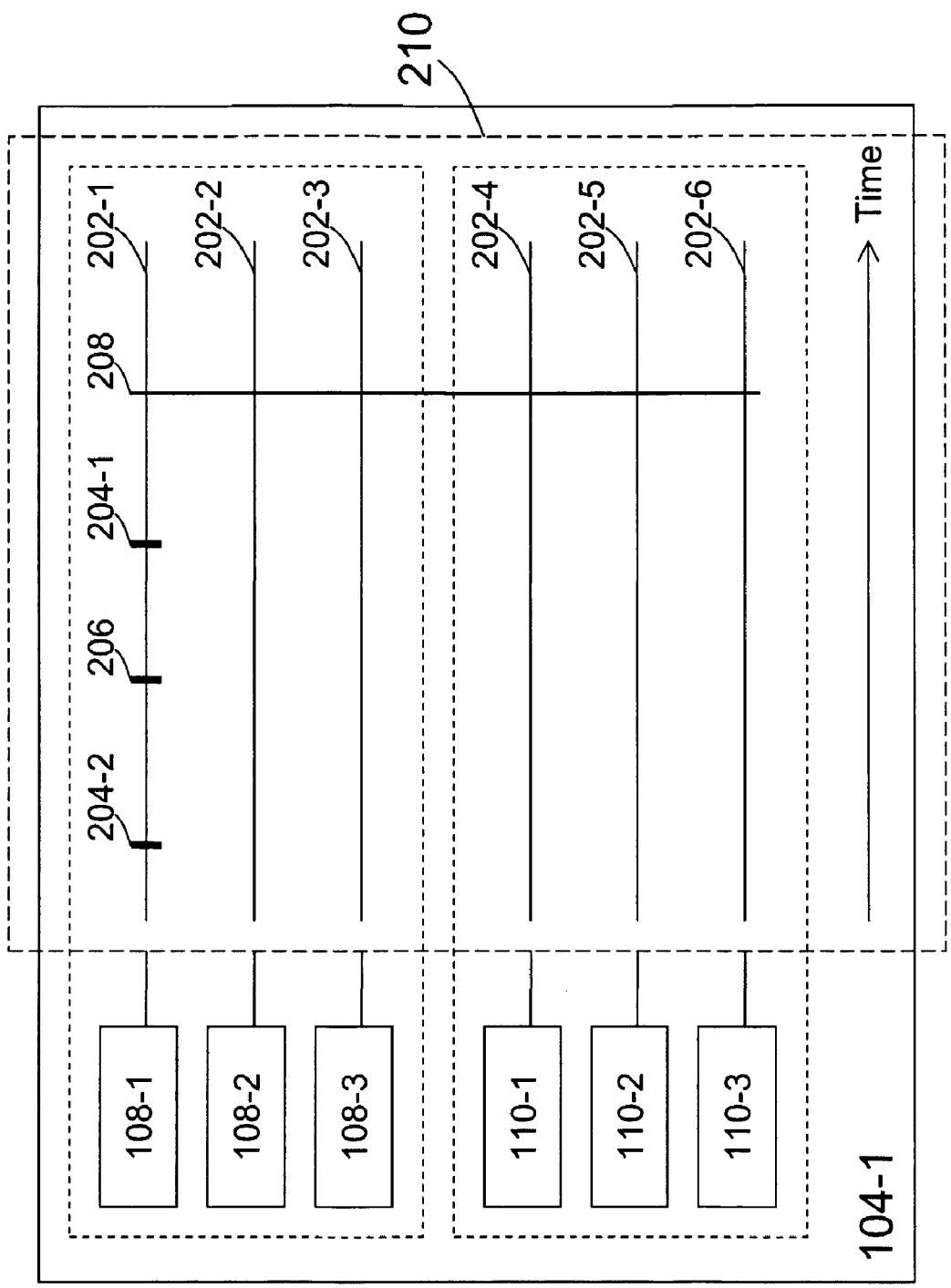
FIG. 2 illustrates an example node that comprises processes that generate progress logs monitored by counterpart processes according to an embodiment of the present invention.

FIG. 2 illustrates an example embodiment in which an activeness monitoring mechanism on the node 104-1, in conjunction with the operating system (e.g., UNIX) and/or the database system software deployed thereon, monitors activeness of processes (e.g., 108 and 110) on the node 104.

As used herein, the term "monitoring activeness of a process" means monitoring past operation information, for example in a progress report 202, as reported by the process; based on the past operation information, the activeness monitoring mechanism, or a counterpart process, may determine whether the process is adequately serving a particular function for which the process is designated. Monitoring activeness of a process is different from monitoring the lifecycle of the process by the operating system on the node 104. The operating system on the node 104 may implement a state machine to keep track of a process's state. Possible states in such a state machine for a process, as implemented by the operating system, may be running, interruptable, zombie, stopped, etc. Monitoring a process's state (in a state machine) by the operating system is agnostic to the function for which the process is designated. Take, for example, a process that is a database writer process that is to serve a designated function of writing dirty blocks into durable data store of the database system. Whether the database writer process is currently serving the designated purpose is not something monitored by the operating system. Even if the database writer process is rejecting every request to write dirty blocks, the operating system may nevertheless consider the process in a normal running state. In contrast, the process activeness monitoring as described herein determines whether the process is currently serving the designated function of writing dirty blocks into durable data store of the database system. In some embodiments, even if the database writer process is in a normal running state as to the operating system, the process activeness mechanism can nevertheless determine that the database writer process is rejecting every request to write dirty blocks and conclude that the database writer process is currently not serving its designated function.

Progress Logs

For the purpose illustration, as shown in FIG. 2, the processes (108 and 110) may report their activities in progress logs (202-1 through 6). To report its activities, a process updates a process log 202 that is associated with the process from time to time. This updating may occur periodically, at a particular logic point in a processing loop, at a logic point of being given an operation to perform, at a logic point of completing an operation, when a timer fires, etc. The information reported in the progress log may include what operation types and how many of each operation type have been performed by the process. The information may optionally and/or additionally include whether each operation performed by the process succeeds the first time, is retried and then succeeds, or fails. In some embodiments, additionally and/or optionally, timing information such as beginning time or ending time for an operation may be reported in the progress log 202. This timing information for the operation may be expressed in terms of one or more timestamps. In some embodiments, besides the beginning time and the ending time, other significant points of time may also be reported for the operation.

Counterpart Processes

In some embodiments, under the activeness monitoring mechanism, one or more counterpart processes may monitor a progress log (e.g., 202-1) generated by a process (e.g., 108-1). As used herein, the term "counterpart process" refers to a process that is interested in determining process activeness of another process. In some embodiments, these counterpart processes may be processes that rely on the process 202-1. In some embodiments, besides monitoring one or more progress logs of their interests, these counterpart processes themselves may serve other functions that are in turn relied on by other processes. Thus progress logs generated by these counterpart processes may be monitored for activeness by other counterpart processes. In some other embodiments, these counterpart processes may be dedicated processes serving the only function of monitoring activeness of one or more processes in a plurality of processes on the node 104-1. In some embodiments, both non-dedicated and dedicated processes can be simultaneously used to monitor process activeness on the node 104-1.

A progress log 202 presents, along a timeline, reported activities of a process (108 or 110) as indicated in FIG. 2. As illustrated, the process logs 202-1 through 3 are associated with (i.e., contain information reported by) the non-restartable processes 108-1 through 3. Similarly, the process logs 202-4 through 6 are associated with the restartable processes 110-1 through 3. Generally speaking, a counterpart process may continually monitor a progress log 202 by examining the process log 202 at a plurality of times. For example, the counterpart process may examine the process log 202 periodically, at a particular logic point in a processing loop, at a logic point of being given an operation to perform, at a logic point of completing an operation, when a timer fires, etc. The examination of the progress log 202 by the counterpart process may be done asynchronously with the writing of the progress log by the associated process (which reports activities in the progress log). Different counterpart processes may examine different progress logs 202 at different times. For the purpose of illustration, the progress log 202-1 is examined by the activeness monitoring mechanism (through a particular counterpart process) at various times 204 as indicated in FIG. 2. In some embodiments, the progress log 202-1 comprises a last modified timestamp that indicates when the process 108-1 last updates the progress log 202-1. Since the progress log 202-1 stores activities of the process 108-1 starting from a particular point of time in the past (prior to the time indicated by the last modified timestamp), the counterpart process may count, for each operation type, how many operations have been completed, how many operations have failed, and how many operations have experienced problems, between any two points of time in the time period covered by the timeline of activities as reported by the process 108-1.

Example Examinations of an Example Process Log

For the purpose of illustration, up to a present time 208, the counterpart process may have made two examinations of the progress log 202-1 at the times 204-1 and 204-2. Here, the time 204-1 is before the time 204-2. In a first examination at the time 204-1, the counterpart process may first determine how long ago the progress log 202-1 was last updated before the time 204-1. For the purpose of illustration, the counterpart process may determine that the progress log 202-1 was last updated at a time 206 based on a value of the last modified timestamp of the progress log 202-1 as examined at the time 204-1.

In some embodiments, the process 108-1 comprises progress log updating logic that updates the progress log 202-1 at least once within a first time window. In some embodiments, the counterpart process may be configured to conclude that the process 108-1 is out of service if the process 108-1 fails to update the progress log 202-1 within a second time window. The second time window in the counterpart process may or may not be independently configured with the first time window. In a particular embodiment where the first and second time windows are configured as correlated time windows, the second time window may be set to be larger than the first time window. For example, the second time window may be set as a multiple of the first time window such as three times of the first time window. Thus, if the process 108-1 fails to update the progress log 202-1 a number of times in a row along the time direction, the counterpart process may determine that the process 108-1 has failed to update the progress log 202-1 within the second time window. Hence the counterpart process may conclude that the process 108-1 is out of service. The counterpart process may draw this conclusion even if the process 108-1 is in a normal state to the operating system of the node 104-1.

Example Process Profile

If the counterpart process determines that the time 206 at which the progress log 202-1 was last updated before the time 204-1 is within the second time window from the time 204-1, the counterpart process may further determine what operation types and how many of these operations the process 108-1 has made since the last time when the progress log 202-1 was examined by the counterpart process. In some embodiments, each time when the counterpart process examines the progress log 202-1, the counterpart process may establish an image (or snapshot) of a process profile for the process 108-1. This process profile is dynamically changing. In some embodiments, the counterpart process may keep a plurality of images of the process profile, each of which images may represent the process profile at each of a plurality of times 204.

An image of the process profile may comprise a listing of operation types the process 108-1 performs up to a time 204 when the counterpart process examines the progress 202-1. This image of process profile may further comprise a count for each operation type performed by the process 108-1. Based on the progress log 202-1, the counterpart process may calculate an average rate for each operation type. Such an average rate represents how many operations of a particular type the process 108-1 are expected to perform on average in a unit time interval. Thus, if it is determined that a present rate for an operation type (which supports the function associated with the process 108-1) between two successive times 204 performed by the counterpart process is much smaller than the average rate, the counterpart process may determine that the process 108-1 is running abnormally, even if the progress 108-1 is in a normal running state to the operating system of the node 104. In a particular embodiment, the counterpart process may be configured to conclude that the process 108-1 is running abnormally if the present rate for a particular operation type is below a third of the average rate. The counterpart process may be configured to conclude that the process 108-1 is running abnormally based on a different ratio. The counterpart process may also be configured to a different ratio for a different operation type to be used to determine whether the process 108-1 is running abnormally or not.

In some embodiments, if it is determined that a present rate for an operation type (which may be a deadlock timeout operation that is a liability in serving the designated function normally) between two successive times 204 performed by the counterpart process is much larger than the average rate, the counterpart process may determine that the process 108-1 is running abnormally, even if the progress 108-1 is in a normal running state to the operating system of the node 104. In a particular embodiment, the counterpart process may be configured to conclude that the process 108 is running abnormally if the present rate for a particular operation type is above three times of the average rate. The counterpart process may be configured to conclude that the process 108 is running abnormally based on a different ratio other than three times. The counterpart process may also be configured to a different ratio for a different operation type to be used to determine whether the process 108-1 is running abnormally or not.

In some embodiments, besides determining whether the process is serving its function normally, the activeness monitoring mechanism may also determine quantitatively how well the process is serving its function normally using the process profile and the progress log. For example, the aforementioned average rates for one or more operation types may be used to calculate the completion rates or the failure rates of these operation types. Based the completion rates and failure rates, one or more quantitative measures may be obtained to indicate the health of the process in a quantitative manner.

Additional Example Features

It has been described that a counterpart process, or one or more counterpart processes, may examine a progress log 202 as reported by a process 108. It should be noted that this is for illustration purposes only. The present invention is not so limited. Other mechanisms such as dedicated processes, or logic directly implemented in the activeness monitoring mechanism, or logic implemented in a process control mechanism, or logic implemented in one or more system processes may be used to examine progress logs as reported by processes in a similar manner.

It has been described that a process (108 or 110) may report its activities in a progress log 202. In some embodiments, processes (108 or 110) may report their activities collectively in a global data store such a system global area (SGA). A process may write its process activity information along with information (e.g., a unique tag) that can be used to identify the process. For example, a progress log 202 as reported by a process (108 or 110) may comprise all the information reported by the process in the SGA. A counterpart process may use the unique tag that is associated with the process to examine all the process activity information reported by the process. In some embodiments, a part, or all, of the process activity information may have already been generated on the node 104 prior to the deployment of the activeness monitoring mechanism on the node 104. In some embodiments, a part, or all, of the process activity information will be generated on the node 104 following the deployment of the activeness monitoring mechanism on the node 104. The information may indicate how many attachment operations have been performed by a plurality of processes, how many latch securing operations have been performed thereby, how many database operations have been completed thereby, how many deadlock handling operations have been performed thereby, how many transactions have been processed thereby, etc. In some embodiments, the activeness monitoring mechanism comprises process activity determination logic to interact with the operating system and/or database system (through function calls, for example) to gather additional process activity information for the plurality of processes at runtime.

Restoring Process Activeness

When a counterpart process determines that a particular process is not serving its function normally, the counterpart process reports its determination and/or other findings about the particular process to the activeness monitoring mechanism. The activeness monitoring mechanism in turn determines an activeness restoration strategy. In determining the activeness restoration strategy, the activeness monitoring mechanism takes into account whether the process is restartable or non-restartable, what type of problem(s) the process is experiencing, if and what other problems are occurring on the node 104 or in the cluster.

In some embodiments, if the activeness monitoring mechanism determines that the process is restartable, it may terminate the process and spawn another like process. In some embodiments, if other existing processes are available for taking over the workload of the process, the activeness monitoring mechanism may simply terminate the process. If the process is non-restartable, the activeness monitoring mechanism may determine whether the problem which the non-restartable process experiences is non-fatal. As used herein, a non-fatal problem experienced by a process is a problem that can be fixed without terminating the process. For example, the activeness monitoring mechanism may determine that the non-restartable process is getting too little CPU time and cannot finish its tasks on time. The activeness monitoring mechanism may therefore elevate the priority level of the non-restartable process so that it can be given a larger share of CPU time than before. This may resolve the difficulty with which the process has encountered in carrying out its designated function. The activeness monitoring mechanism may also determine that the non-restartable process is being denied too many times access to shared data blocks. Some other processes may be hogging resources such as latches to the shared data blocks. The activness monitoring mechanism may take actions to prompt these other processes to voluntarily or involuntarily give up the resources (e.g., the latches in the present example). The activeness monitoring mechanism may reduce the frequency of flushing dirty blocks from buffer cache to durable data storage of the database system, thereby reducing probability of conflict in securing resources among processes on the node 104. The activeness monitoring mechanism may also abort or terminate non-critical processes such as garbage collection processes or logging processes, in order to provide the non-restartable process resources it needs to serve its function normally.

If the activeness monitoring mechanism determines that the problem experienced by the non-restartable process cannot be fixed without restarting the non-restartable process, the activeness monitoring mechanism may prepare the node 104 for an orderly shutdown and reset/reboot the node 104.

Example Process

FIG. 3 illustrates an example process on a node such as 104-1 under new techniques as described herein. In block 310, an activeness monitoring mechanism as previously described monitors one or more progress logs (e.g., 202) generated by one or more processes (108 or 110). These one or more processes may form a progress group or a process pool and serve a function such as database writing, database sessions, etc, and support a common set of operation types. The monitoring of the progress log by the activeness monitoring mechanism may be through counterpart processes. For example, a process that depends on another process may monitor a progress log generated by the latter and report the monitoring results to the activeness monitoring mechanism. Here, the progress logs include past operation completion information reported by the one or more processes. In some embodiments, each of the progress logs further includes a timestamp at which the progress log was last updated in the past by the one or more processes. In some embodiments, the progress logs further include a count of operations of a particular type that have been completed by the one or more processes.

In some embodiments, to monitor the one or more progress logs, the counterpart processes may take a first snapshot of a progress profile related to a first time and a second snapshot of the progress profile related to a second time, and may compare the first snapshot and the second snapshot. In some embodiments, to monitor the one or more progress logs, the counterpart processes may calculate an average rate for an operation type.

In block 320, the activeness monitoring mechanism determines, based on the past operation completion information in the progress logs, whether one or more processes are running normally. This may be determined from the progress logs. For example, a process is considered not normal if it does not update its progress log for an extended period of time. The process may be considered as not running normally if operations it performs indicate failures or non-performance of operations that support the process's function. As noted previously, as used herein, "running normally" to the activeness monitoring mechanism is not the same as the process's state tracked by the operating system of the node 104-1.

In block 330, in response to determining, based on the past operation completion information in the progress log, that one or more processes are not running normally, the activeness monitoring mechanism determines whether at least one of the one or more processes is restorable to be running normally. In some embodiments, to determine whether at least one of the one or more processes is restorable to be running normally, the activeness monitoring mechanism may determine whether at least one of the one or more processes should be assigned with a high priority. This may be preferable to rebooting or resetting the node 104-1 if the process experiencing problems is non-restartable. In some embodiments, to determine whether at least one of the one or more processes is restorable to be running normally, the activeness monitoring mechanism may determine whether at least one of the one or more processes should be killed. This may be done, for example, without rebooting or resetting the node 104-1, if the process experiencing problems is restartable or it the workload of the process (whether restartable or non-restartable) can be shared by other existing processes. In some embodiments, a new process may be determined to be necessary and thus may be spawned to restore the function of the process experiencing problems.

In some embodiments, the activeness monitoring mechanism may determine that the one or more processes are non-restartable. To restore impaired functions in the node 104-1, the activeness monitoring mechanism may determine whether the node 104-1 should be rebooted or reset.

Hardware Overview

Figure 4:
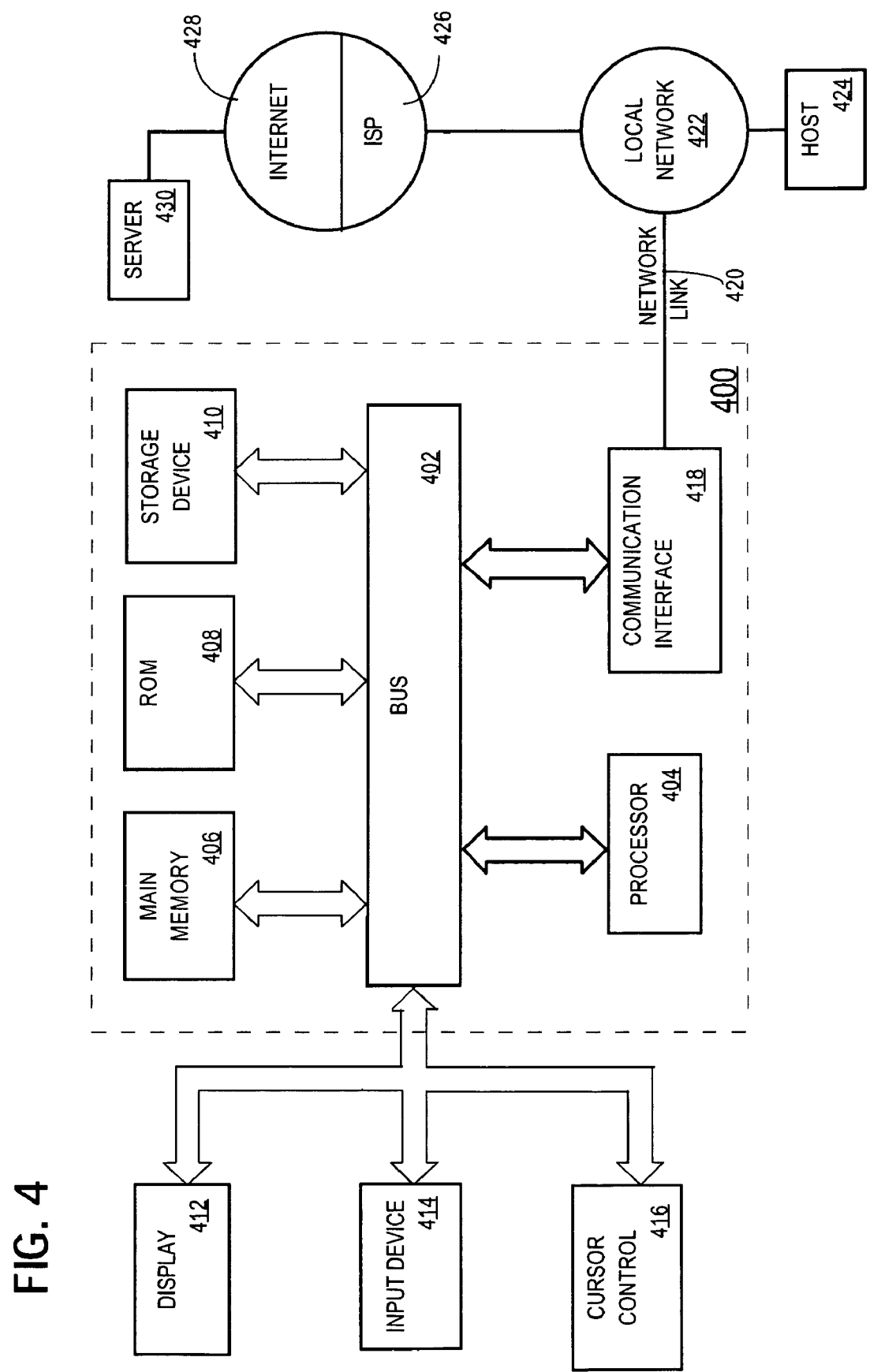
FIG. 4 is a block diagram of a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to an embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the computer-implemented steps of:

a plurality of processes executing on a node, wherein each process of said plurality of processes writes to one or more progress logs operation completion information that specifies operation types for said each process, and for each operation type, information about how often each operation type was performed in the past;

a counter-part process monitoring the one or more progress logs;

the counter-part process determining, based on the operation completion information in the one or more progress logs, whether a particular process of said plurality of processes is running at a normal level of activity, wherein the counter-part process is different than the particular process; and in response to determining, based on the operation completion information in the one or more progress logs, that the particular process is not running at a normal level of activity, the counter-part process determining whether the particular process is restorable to be running at the normal level of activity.

2. A method as recited in claim 1, wherein the plurality of processes forms a process group that supports a common set of operation types.

3. A method as recited in claim 1, wherein the counter-part process monitoring the one or more progress logs includes taking a first snapshot of a progress profile related to a first time from the one or more progress logs and a second snapshot of the progress profile related to a second time from the one or more progress logs and comparing the first snapshot and the second snapshot.

4. A method as recited in claim 1, wherein the counter-part process monitoring the one or more progress logs includes calculating an average rate for an operation type.

5. A method as recited in claim 1, wherein determining whether the particular process is restorable to be running at the normal level of activity includes determining whether the particular process should be assigned with a high priority.

6. A method as recited in claim 1, wherein determining whether the particular process is restorable to be running at the normal level of activity includes determining whether the particular process should be killed.

7. A method as recited in claim 1, wherein determining whether at least one of the plurality of processes is restorable to be running at the normal level of activity includes determining whether a new process should be spawned to share workload with the plurality of processes.

8. A method as recited in claim 1, wherein determining whether the particular process is restorable to be running at the normal level of activity includes determining whether a node on which the plurality of processes reside should be restarted to restart all processes on the node.

9. A method as recited in claim 1, wherein the one or more progress logs include one or more timestamp indicating times at which the one or more progress logs were last updated in the past by the plurality of processes.

10. A method as recited in claim 1, wherein the one or more progress logs include a count of operations of a particular type that have been completed by the plurality of processes.

11. A non-transitory computer-readable storage medium storing one or more sequences of instructions which, when executed by one or more processors, causes the one or more processors to perform:

a plurality of processes executing on a node, wherein each process of said plurality of processes writes to one or more progress logs operation completion information that specifies operation types for said each process, and for each operation type, information about how often each operation type was performed in the past;

a counter-part process monitoring the one or more progress logs;

the counter-part process determining, based on the operation completion information in the one or more progress logs, whether a particular process of said plurality of processes is running at a normal level of activity, wherein the counter-part process is different than the particular process; and in response to determining, based on the operation completion information in the one or more progress logs, that the particular process is not running at a normal level of activity, the counter-part process determining whether the particular process is restorable to be running at the normal level of activity.

12. A medium as recited in claim 11, wherein the plurality of processes forms a process group that supports a common set of operation types.

13. A medium as recited in claim 11, wherein the counter-part process monitoring the one or more progress logs includes taking a first snapshot of a progress profile related to a first time from the one or more progress logs and a second snapshot of the progress profile related to a second time from the one or more progress logs and comparing the first snapshot and the second snapshot.

14. A medium as recited in claim 11, wherein the counter-part process monitoring the one or more progress logs includes calculating an average rate for an operation type.

15. A medium as recited in claim 11, wherein determining whether the particular process is restorable to be running at the normal level of activity includes determining whether the particular process should be assigned with a high priority.

16. A medium as recited in claim 11, wherein determining whether the particular process is restorable to be running at the normal level of activity includes determining whether the particular process should be killed.

17. A medium as recited in claim 11, wherein determining whether the particular process is restorable to be running at the normal level of activity includes determining whether a new process should be spawned to share workload with the plurality of processes.

18. A medium as recited in claim 11, wherein determining whether the particular process is restorable to be running at the normal level of activity includes determining whether a node on which the plurality of processes reside should be restarted to restart all processes on the node.

19. A medium as recited in claim 11, wherein the one or more progress logs include one or more timestamp indicating times at which the one or more progress logs were last updated in the past by the plurality of processes.

20. A medium as recited in claim 11, wherein the one or more progress logs include a count of operations of a particular type that have been completed by the plurality of processes.

* * * * *

UNITED STATES PATENT AND TRADEMARK OFFICE
CERTIFICATE OF CORRECTION

PATENT NO.        : 8,266,479 B2
APPLICATION NO.   : 12/419227
DATED             : September 11, 2012
INVENTOR(S)       : Chan et al.

It is certified that error appears in the above-identified patent and that said Letters Patent is hereby corrected as shown below:

In column 5, line 30, delete "interruptable," and insert -- interruptible, --, therefor.

In column 9, line 35, delete "activness" and insert -- activeness --, therefor.

Signed and Sealed this
Eighteenth Day of December, 2012

David J. Kappos
*Director of the United States Patent and Trademark Office*